(No Model.)
C. W. BENSCHOTER.
FARM GATE.
No. 347,152. Patented Aug. 10, 1886.
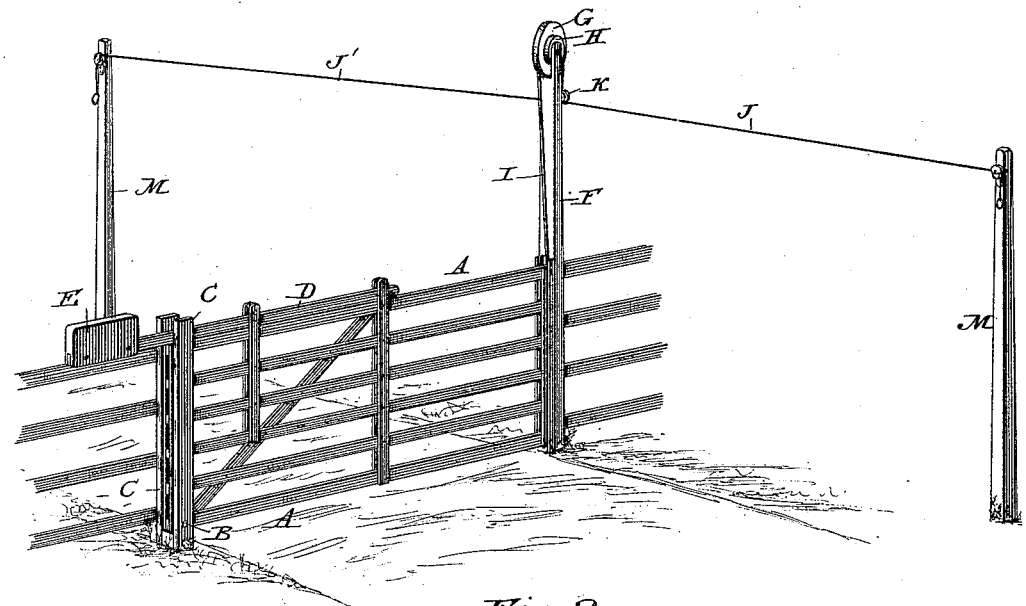
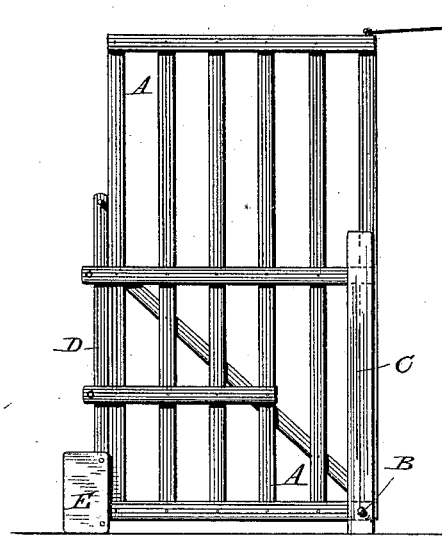
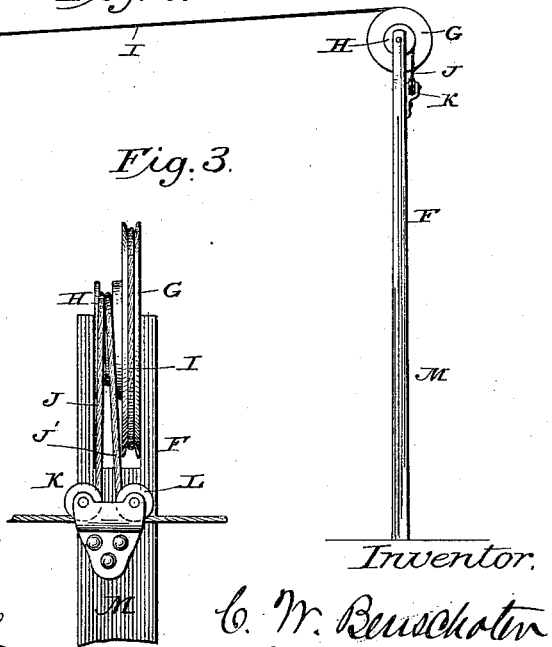

UNITED STATES PATENT OFFICE.

CHARLES W. BENSCHOTER, OF GRAND RAPIDS, OHIO.

FARM-GATE.

SPECIFICATION forming part of Letters Patent No. 347,152, dated August 10, 1886.

Application filed May 22, 1886. Serial No. 203,031. (No model.)

*To all whom it may concern:*

Be it known that I, CHARLES W. BENSCHOTER, of Grand Rapids, in the county of Wood and State of Ohio, have invented certain Improvements in Farm-Gates, of which the following is a specification.

My invention relates to that class of gates which are pivoted at the outer lower corner and arranged to swing upward and outward from the roadway; and it consists in the combination of said gate with a movable weight, and with operating cords and pulleys in a manner hereinafter described.

In the accompanying drawings, Figure 1 represents a perspective view of my gate and its connections, the gate being in a closed position. Fig. 2 is a side elevation showing the gate in its open position. Fig. 3 is a front elevation showing the manner in which the gate-operating cords are connected.

Referring to the drawings, A represents the gate proper, constructed in the form of a rigid rectangular frame, and mounted at its lower outer corner on a horizontal pivot, B, supported in two uprights or posts, C, between which the gate is sustained. At its top the gate is provided with a longitudinally-sliding bar, D, having at its rear end a weight, E. Being thus weighted and pivoted the gate may be readily tipped upward and backward about its pivot into the position shown in Fig. 2, out of the roadway. As the gate approaches the vertical position, the weight bears upon the ground and the weight-bar slides upward upon the gate, thus allowing the gate to assume a vertical position with a smooth and easy action. As the gate is tipped downward toward its closed position, the weight gradually slides outward, thus offering an increased resistance, so that a substantial equipoise of the parts is maintained.

The gate may be operated by hand; but when used for carriage-roads I prefer to connect therewith operating-cords, as shown in the drawings. At the forward end of the gate a tall standard, F, is erected, and provided at its upper end with a large pulley, G, having on one side a small pulley or drum, H. A cord, I, is extended from the lower front corner of the gate to the pulley G, and a second cord, J J', is secured to and wound upon the drum H, and its two ends pass thence downward in opposite directions under guide-pulleys K and L, to posts or other supports, M, located at a distance from and on opposite sides of the gate adjacent to the roadway. If, when the gate is in a closed position, strain be applied to either of the cords J or J' it will unwind from the drum H, causing the latter to rotate and impart a rotary motion to the pulley G, winding the cord I thereon. The cord I will act to lift the gate and tip the same beyond the balancing-point, whereupon the weight will act to continue its motion until it reaches the upright or open position shown in Fig. 2. As the gate completes its opening movement it again unwinds the cord I from the pulley G, causing the operating-cord J to be again wound on the drum H. The parts stand in this position when the gate is open. If, now, either of the operating-cords is again actuated they will rotate the pulley G, and, winding the cord I thereon, will drop the gate forward until it reaches a point from which it will drop to the closed position by gravity. Thus it will be seen the cord I and pulley G are caused to effect the opening and closing of the gate, the momentum of the latter being relied upon to carry the center of gravity first to one side and then to the other of the pivot that the opening and closing movements may be completed by gravity.

Having thus described my invention, what I claim is—

1. The vertically-swinging gate pivoted at its outer lower corner, in combination with the horizontally-sliding bar D, mounted thereon, and provided at its overhanging end in rear of the gate with the weight E.

2. In combination with the vertically-swinging gate pivoted at its outer lower corner, a winding-pulley located in an elevated position, substantially as described, a cord extending from said pulley to the lower forward corner of the gate, and means, substantially as described, for operating said pulley.

3. In combination with the vertically-swinging gate, the elevated winding-pulley, the cord extending thence to the lower front corner of the gate, the drum connected with said pulley, and the cords extending from said drum over suitable guides, and thence in opposite directions from the gate.

In testimony whereof I hereunto set my hand this 14th day of April, 1886, in the presence of two attesting witnesses.

CHARLES W. BENSCHOTER.

Witnesses:
A. J. GARDNER,
GEO. LASKEY.